Dec. 2, 1969  M. L. WHALEY  3,481,065
PURSE RING STRIPPER AND METHOD OF USING SAME
Filed Sept. 16, 1968  3 Sheets-Sheet 1

INVENTOR.
MORRIS L. WHALEY
BY Knox & Knox

Dec. 2, 1969  M. L. WHALEY  3,481,065
PURSE RING STRIPPER AND METHOD OF USING SAME
Filed Sept. 16, 1968  3 Sheets-Sheet 2

INVENTOR.
MORRIS L. WHALEY
BY Knox & Knox

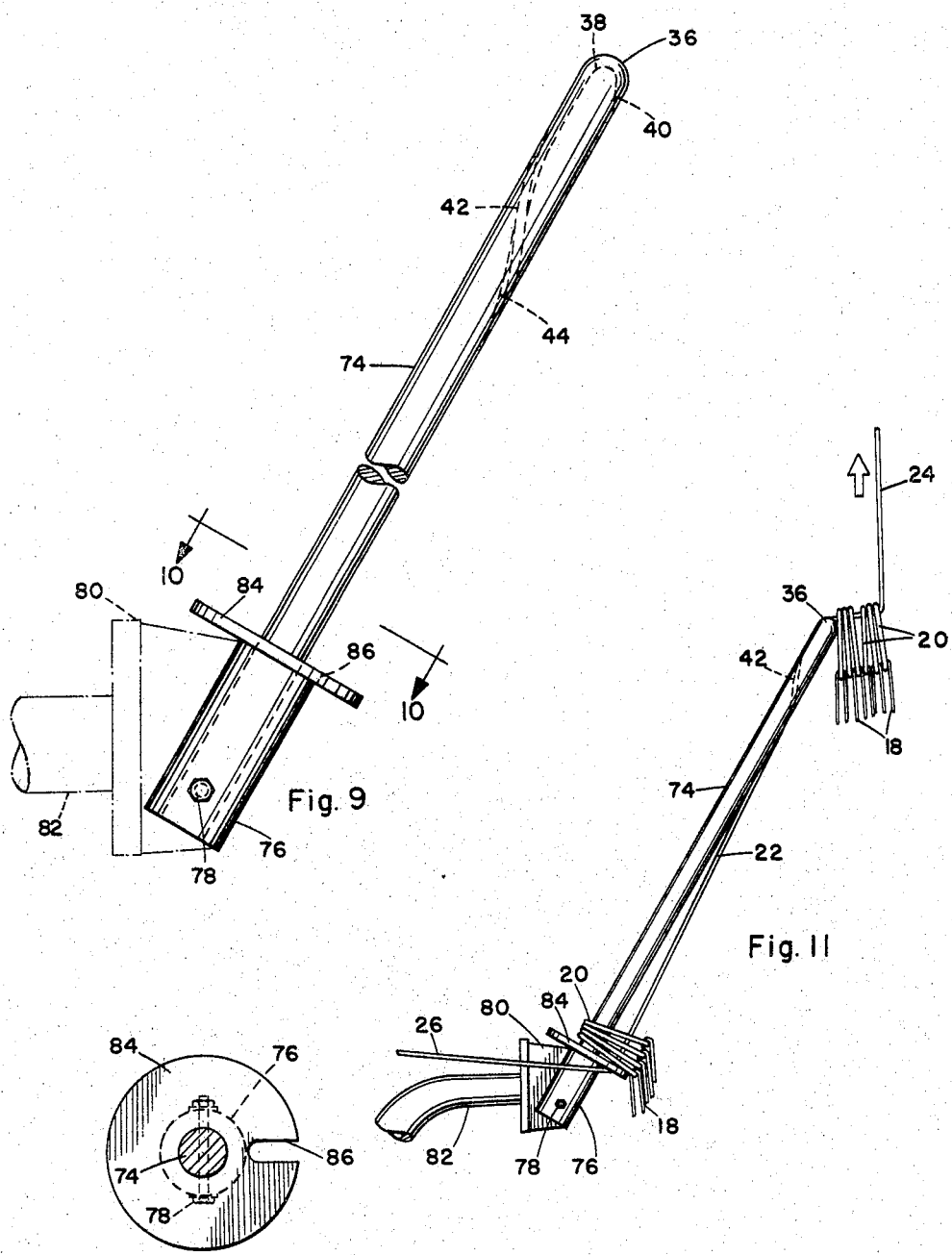

United States Patent Office 3,481,065
Patented Dec. 2, 1969

3,481,065
PURSE RING STRIPPER AND METHOD OF USING SAME
Morris L. Whaley, 98 4th Ave., Chula Vista, Calif. 92010
Continuation-in-part of application Ser. No. 707,160, Feb. 21, 1968. This application Sept. 16, 1968, Ser. No. 791,199
Int. Cl. A01k *73/12*
U.S. Cl. 43—4.5        10 Claims

ABSTRACT OF THE DISCLOSURE

In the technique of purse seining, the collection and securement of the purse rings is simplified by attaching one end of the pursing line to a special hook or bar member mounted on the boat and hauling in the other end of the pursing line so that the rings are fed consecutively and automatically onto the hook. The rings are retained on the hook until the net is ready to be stowed, then the rings feed off in order during the stowing operation. In one form the bar member is substantially U-shaped and in another form the member is substantially straight and upwardly inclined. In each form the free end is grooved to receive the line.

CROSS REFERENCE TO RELATED APPLICATION

The present invention is a continuation-in-part of now abandoned application Ser. No. 707,160, filed Feb. 21, 1968 and entitled Purse Ring Stripper and Method of Using Same.

BACKGROUND OF THE INVENTION

The present invention relates to fishing apparatus of the purse seine type and specifically to a purse ring stripper and the method of use.

In the conventional purse seining operation, a long wall net is laid in a loop around a school of fish and the ends brought together at the boat. The upper edge of the net is supported by floats and the lower edge is weighted, so that the net hangs vertically in the water. Attached to the lower edge are spaced rings, usually 60 to 80 on a net, through which is threaded a pursing line. When the pursing line is hauled in, the bottom edge of the net is drawn inwardly or pursed to trap the fish. The pursing operation is continued until the purse rings are pulled onto the deck of the boat, where they are collected and usually secured in groups to avoid tangling and possible slippage which could allow the net to open. Since the rings are heavy and wet and are attached to a net loaded with fish, while the boat may be in continuous motion, the ring securing operation is difficult and requires considerable skill and physical effort.

SUMMARY OF THE INVENTION

The improved method of operation described herein involves the use of a special hook or bar member which is mounted on the side of the boat at the location where the pursing line is normally hauled in. The hook is large enough to hold all of the rings on the net and is provided with a channel in which the pursing line is threaded so that each ring can slide from the line onto the hook. One end of the pursing line is fixed at the root end of the hook and the other end is hauled in. The rings are thus drawn together and are stripped consecutively onto the hook as the line is hauled in, the rings remaining on the hook and holding the net securely pursed and then stripping off consecutively as the net itself is hauled in and stowed in the conventional manner.

BRIEF DESCRIPTION OF THE DRAWING

FIGURE 6 is a perspective view showing the typical arrangement of a purse seine;

FIGURE 9 is a side elevation view of an alternative form of the hook or bar member;

FIGURE 10 is a sectional view taken on line 10—10 of FIGURE 9; and

FIGURE 11 is a side elevation view, on a reduced scale, showing the collection of rings on the alternative hook.

DESCRIPTION OF THE PREFERRED EMBODIMENT

Figure 1:
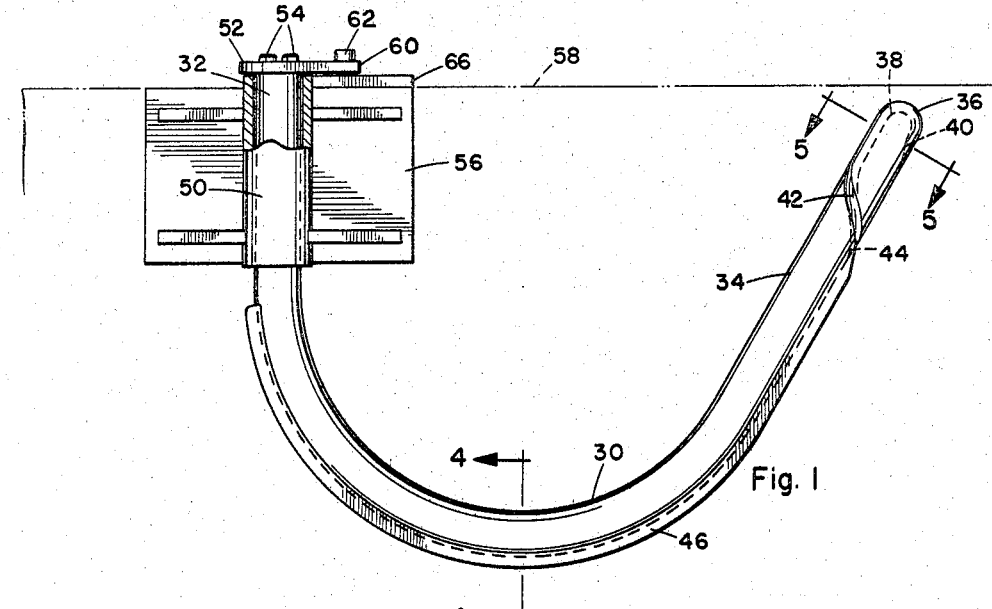
FIGURE 1 is a side elevation view partially cut away, of one form of the hook assembly with a diagrammatic representation of its attachment to a boat.

The conventional purse seine, illustrated somewhat diagrammatically in FIGURE 6, comprises a wall net 10 with floats 12 attached to the upper edge and weights 14 on the lower edge to hold the net substantially vertical in the water. Retaining lines 16 at the upper edge connect the net to the boat. Along the lower edge of the net 10 are bridles 18 of chain or cable, each carrying a purse ring 20. Threaded through the purse ring 20 is a pursing line 22, usually of stranded steel cable, by which the lower end of the net is closed or pursed as the two ends 24 and 26 of the line are hauled in by a winch or similar means on the boat. The specific details of the net and the operation are well known.

Figure 3:
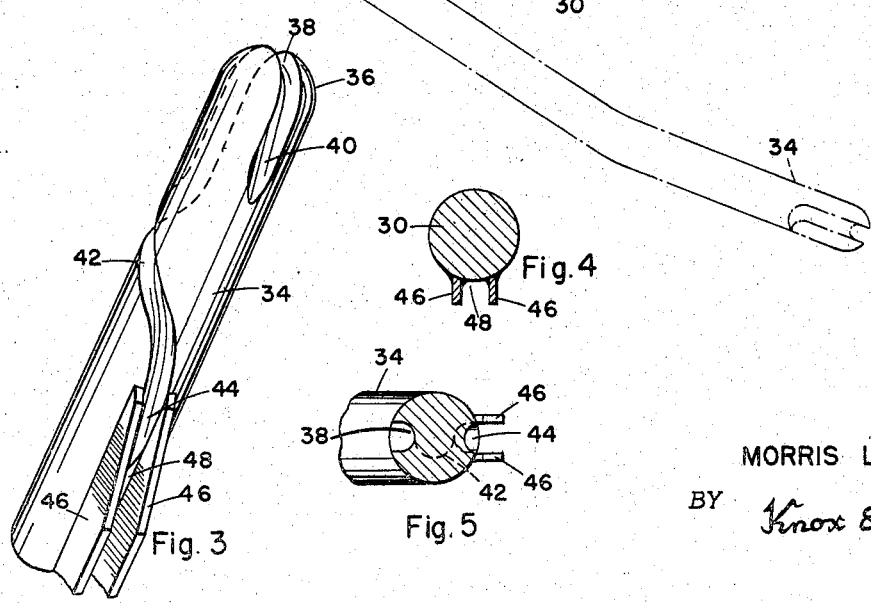
FIGURE 3 is an enlarged perspective view taken of the tip portion of the hook.
Figure 4:
FIGURE 4 is an enlarged sectional view taken on line 4—4 of FIGURE 1.
Figure 5:
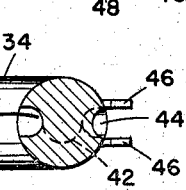
FIGURE 5 is an enlarged sectional view taken on line 5—5 of FIGURE 1.

One illustrated form of the hook or bar member 30 is round bar material and is shown in FIGURE 1 as having a generally U-shaped portion with one end extending upwardly to provide a vertical shaft portion 32, the other end having an elongated prong portion 34 inclined upwardly and away from the shaft. Prong portion 34 is also angularly offset slightly from the plane of the hook on the side toward the boat. The tip 36 of prong portion 34 is smoothly rounded, the end of the prong having a groove 38 extending longitudinally along the inside, over the outside with a tapered run-out 40, as shown in detail in FIGURE 3. From the inside of the prong, the groove 38 has a spiral portion 42 extending around to the outside and terminating in a tapered runout 44. Fixed to the outside of hook 30 are two spaced parallel ribs 46 forming a channel 48 substantially the same width as the groove 38. Ribs 46 overlap run-out 44 and extend almost to the shaft 32, so that a continuous channel is formed to receive pursing line 22, as hereinafter described.

Figure 2:
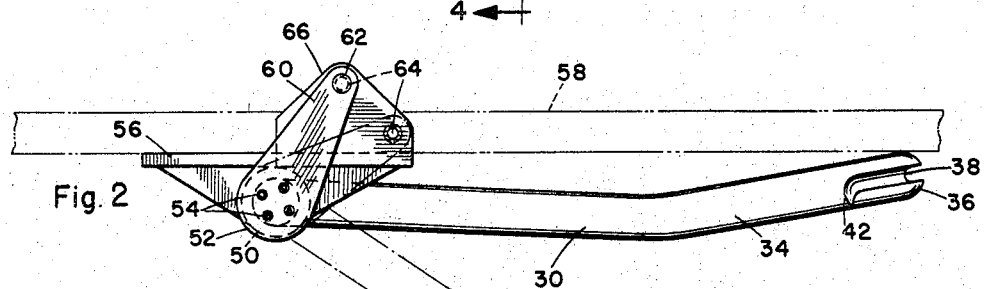
FIGURE 2 is a top plan view thereof.

Shaft portion 32 is journalled in a sleeve 50 and is retained by a cap plate 52 secured to the upper end of the shaft by suitable screws 54. Sleeve 50 is fixed to a mounting bracket 56, which is secured to the outside of the boat at the upper edge of the side or bulwark, indicated in broken line at 58, so that the hook can swing generally horizontally. Since the boat can be of steel, wood, or other materials, the specific configuration of the bracket and the means of attachment will vary. Cap plate 52 has a radially extending arm 60, at the end of which is a locking pin 62 which fits into either of two sockets 64 in a retaining plate 66 fixed on top of bracket 56. The sockets 64 are spaced so that in one position, shown in full line in FIGURE 2, the hook is folded against the side 58. In the other position, shown in broken line in FIGURE 2, the hook extends angularly outwardly from the boat, the actual angle depending on the seine handling equipment and working clearances. The angular offset of the prong toward the boat aligns the tip with the hoist equipment, while allowing the hook to extend at a sufficient angle for the necessary clearance.

Figure 7:
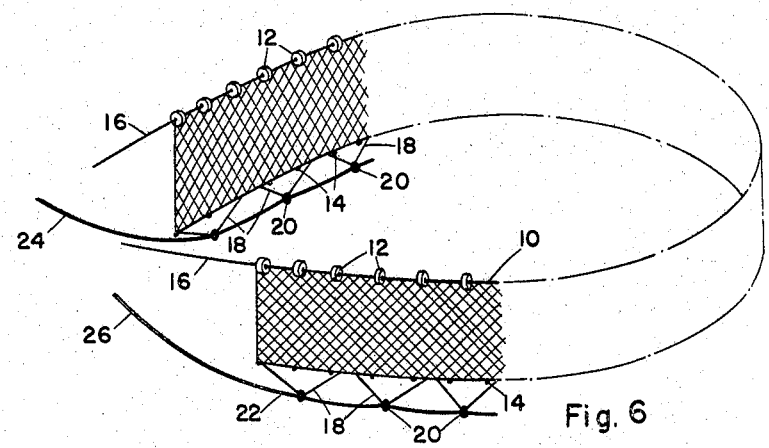
FIGURE 7 is a view of the hook, as taken from the left hand side of FIGURE 1 and on a reduced scale, showing the method of attaching the pursing line to the hook.
Figure 8:
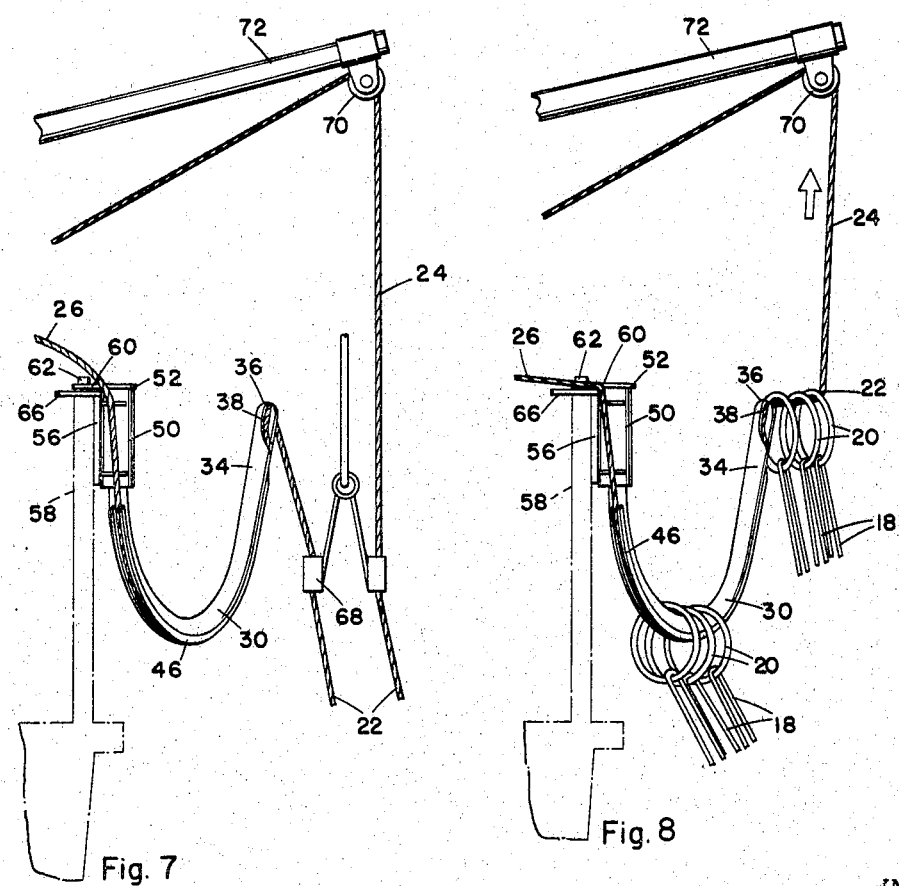
FIGURE 8 is a view similar to FIGURE 7, showing the collection of purse rings on the hook.

The conventional technique is used to lay the seine around the fish and to haul in the pursing line until the seine is pursed sufficiently to contain the fish. Then, as shown in FIGURE 7, a clamp 68 is secured to both ends of the pursing line 22, the clamp being suspended from any suitable support to hold the load on the line. The clamp can be of the conventional type used with shipboard hoist equipment for holding cables. End 24 of the pursing line passes over a pulley 70 on a boom 72 to the winch, not shown, and is left in place. End 26 is disconnected from the winch and attached to hook 30 by placing the line in the groove 38 in the tip 36, around the spiral portion 42 and along channel 48. The end 26 is then secured in any suitable manner to fixed structure. Clamp 68 is then removed from end 26 and the end 24 of pursing line 22 is hauled in, as indicated by the directional arrow in FIGURE 8. As the loop of the pursing line is closed, the rings 20 are gathered closely and lifted until they can slide onto hook 30. By passing pursing line 22 over the tip 36 to the inner or top portion of the hook, a smooth transition is provided from the line to the hook and the rings slide onto the hook consecutively without jamming. For clarity only a few rings are shown, but there may be 60 to 80 rings on a seine. Thus the rings are retained securely on the hook and are not obstructing the working area of the deck, as is the case with the conventional technique of ring collection. The advantage of additional clear deck area and the freeing of a crew member or members, who would normally be occupied in handling the rings, will be obvious. When the net is hauled in in the conventional manner, the rings strip consecutively off the hook and are easily laid out in proper order as the net is folded in position for re-use. Since slippage or inadvertent release of a few rings during the recovery operation can cause the pursed net to open and free the catch, the continuous control and simplified handling of the rings will be appreciated.

An alternative and simplified form of the hook or bar member is shown in FIGURES 9-11. In this form the U-shaped portion is eliminated and the hook becomes a straight bar member 74, the lower end of which is held in a sleeve 76 and secured by a bolt 78 diametrically through the sleeve and bar member. The sleeve 76 is secured by a suitable bracket 80 to a convenient portion of the boat structure, such as an existing davit indicated fragmentarily at 82. The prong may be fixed in place in upwardly extending position, inclined if desired, or, if mounted on a davit with a swinging portion, may be retracted when not in use by turning the davit.

The upper end of the bar member 74 defines a prong portion and has the same configuration as prong portion 34, including the rounded tip 36, groove 38 with an underside run-out 40 and the spiral portion 42 with a run-out 44. However, no ribs are required to guide the pursing line along the prong and spiral portion 42 may be stretched out to hold the line more securely. At the upper end of sleeve 76 is a fixed collar 84 in the form of a flat circular plate, having a radially inwardly extending slot 86 to receive the pursing line 22.

Operation is as described for the U-shaped hook. The pursing line 22 is clamped while end 26 is secured in groove 38 and around spiral portion 42, then passed through slot 86 and secured to convenient structure on the boat, such as to an existing snatch block. End 24 is then hauled in and the gathered rings 20 slip onto the prong 74, as in FIGURE 11. Collar 84 is at least as large in diameter as the rings 20 and thus supports the stack of rings. When the net is hauled in the rings strip consecutively off the prong as before.

With either form of the hook the purse rings need not be directly handled by the crew. It has been found in working tests that the gathered rings will often slip onto the hook in a group in a few seconds. Any momentary bunching or sticking of the rings is easily cleared by a slight slackening then re-tightening of the purse line by the winch operator. In the net retrieval and stowing operation the rings are pulled from the hook one at a time with considerable separation and there is no tendency to jam.

It is understood that minor variation from the form of the invention disclosed herein may be made without departure from the spirit and scope of the invention, and that the specification and drawings are to be considered as merely illustrative rather than limiting.

What is claimed is:

1. A purse ring stripper, comprising:
 a bar member having a portion at one end with mounting means thereon for attachment to a boat;
 the other end of said bar member having an upwardly extending prong portion with retaining means to receive and hold an end of a pursing line, with a substantially smooth transition from the line to the prong portion, whereby pursing rings can slide from the line onto the prong portion.

2. The structure of claim 1, wherein said retaining means includes a pursing line receiving groove extending around and over the top of the tip of said prong portion and spirally around the prong portion to the underside thereof.

3. The structure of claim 2, wherein said bar member includes a generally U-shaped portion between said first and second mentioned portions.

4. The structure of claim 3, wherein said mounting means includes a bracket in which is pivotally held the end of said first mentioned portion, and locking means connected to said bar member to hold the said bar member selectively in a retracted position adjacent the side of the boat, and an extended position angularly outwardly from the boat.

5. The structure of claim 4 and including a pursing line receiving channel extending from said groove around the major portion of the outside of said U-shaped portion.

6. The structure of claim 4 and including a pair of spaced parallel ribs fixed to and extending longitudinally along the major portion of the outside of said U-shaped portion and forming a pursing line receiving channel therebetween, said groove connecting with said channel.

7. The structure of claim 2, wherein said mounting means includes an upwardly extending sleeve in which the end of said first mentioned portion is secured.

8. The structure of claim 7, and including a purse ring supporting collar on the upper end of said sleeve, said collar having a slot to receive the pursing line.

9. In the method of purse seining from a boat, wherein the seine is pursed by hauling in the ends of a pursing line threaded in a loop through spaced rings attached to the lower edge of the seine, the improved method of collecting and holding the rings, comprising:

attaching one end of the pursing line to a ring receiving prong mounted on the boat, the prong being adapted to hold the line with a substantially smooth transition from the line to the prong;

and continuing to haul in the other end of the pursing line to close the loop, whereby the rings slide consecutively from the line onto the prong.

10. The method of claim 9 and including the initial step of clamping the ends of the pursing line adjacent the prong, slackening one end of the line above the clamp to facilitate attachment of the slackened end of the line to the prong and after securing the line to the prong, releasing the clamping on the slackened end of the line.

References Cited

UNITED STATES PATENTS 1,390,006   9/1921   Akre ------------------ 43—8

FOREIGN PATENTS 80,962   11/1952   Norway.

WARNER H. CAMP, Primary Examiner

U.S. Cl. X.R.

43—8, 14